(12) United States Patent
Suzuki et al.

(10) Patent No.: US 9,022,900 B2
(45) Date of Patent: May 5, 2015

(54) CONTROL DEVICE OF CONTINUOUSLY VARIABLE TRANSMISSION FOR VEHICLE

(75) Inventors: Tomoyuki Suzuki, Isehara (JP); Yoshihiko Ota, Isehara (JP); Seiichiro Takahashi, Isehara (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 272 days.

(21) Appl. No.: 13/579,152

(22) PCT Filed: Feb. 21, 2011

(86) PCT No.: PCT/JP2011/053666
§ 371 (c)(1),
(2), (4) Date: Aug. 15, 2012

(87) PCT Pub. No.: WO2011/105323
PCT Pub. Date: Sep. 1, 2011

(65) Prior Publication Data
US 2012/0322613 A1   Dec. 20, 2012

(30) Foreign Application Priority Data
Feb. 23, 2010 (JP) ................................ 2010-037065

(51) Int. Cl.
*B60W 10/10* (2012.01)
*B60W 10/02* (2006.01)
(Continued)

(52) U.S. Cl.
CPC ............ *F16H 61/702* (2013.01); *F16H 37/022* (2013.01); *F16H 61/16* (2013.01); *F16H 61/66259* (2013.01); *F16H 2037/023* (2013.01);
(Continued)

(58) Field of Classification Search
USPC .............. 477/4, 41, 70; 475/214–216; 701/61
See application file for complete search history.

(56) References Cited

U.S. PATENT DOCUMENTS

| | | | |
|---|---|---|---|
| 4,672,863 | A | 6/1987 | Itoh et al. |
| 4,682,518 | A | 7/1987 | Takada et al. |

(Continued)

FOREIGN PATENT DOCUMENTS

| | | |
|---|---|---|
| CN | 1869479 A | 11/2006 |
| EA | 009220 B1 | 4/2007 |

(Continued)

OTHER PUBLICATIONS

Chinese Office Action dated Feb. 28, 2014, (6 pgs.).
(Continued)

*Primary Examiner* — Roger Pang
*Assistant Examiner* — Stacey Fluhart
(74) *Attorney, Agent, or Firm* — Foley & Lardner LLP

(57) ABSTRACT

A control device continuously variable transmission for vehicle according to the present invention includes a continuously variable transmission mechanism capable of continuously changing a speed ratio, a sub-transmission mechanism provided in series with the continuously variable transmission mechanism, including a first gear position and a second gear position having a smaller speed ratio than the first gear position as forward gear positions and adapted to switch between the first gear position and the second gear position by selectively engaging or releasing a plurality of frictional engagement elements, and a transmission control unit wherein a vehicle is stopped with the gear position of the sub-transmission mechanism kept in the second gear position when being stopped in a state where the gear position of the sub-transmission mechanism is in the second gear position.

2 Claims, 9 Drawing Sheets

(51) Int. Cl.
    *F16H 61/16*     (2006.01)
    *F16H 61/66*     (2006.01)
    *F16H 61/70*     (2006.01)
    *F16H 61/662*     (2006.01)
    *F16H 37/02*     (2006.01)

(52) U.S. Cl.
    CPC ....... *F16H 2312/022* (2013.01); *F16H 2312/16* (2013.01); *F16H 2061/163* (2013.01)

(56) References Cited

U.S. PATENT DOCUMENTS

| | | | |
|---|---|---|---|
| 4,836,056 A * | 6/1989 | Nakawaki et al. | 477/43 |
| 4,962,679 A * | 10/1990 | Ishikawa et al. | 60/449 |
| 5,005,442 A | 4/1991 | Sakakibara et al. | |
| 2004/0171445 A1 | 9/2004 | Yamamoto et al. | |
| 2006/0276293 A1 | 12/2006 | Koyama | |
| 2009/0048054 A1 * | 2/2009 | Tsuchiya et al. | 475/216 |

FOREIGN PATENT DOCUMENTS

| | | |
|---|---|---|
| EA | 009220 B1 | 12/2007 |
| EP | 0 199 533 A1 | 10/1986 |
| JP | 61-241561 A | 10/1986 |
| JP | 62-058053 A | 3/1987 |
| JP | 62-181928 A | 8/1987 |
| JP | 62-181928 A | 10/1987 |
| JP | 62-261543 A | 11/1987 |
| JP | 63-280957 A | 11/1988 |
| JP | 1-176851 A | 7/1989 |
| JP | 11-082729 A | 3/1999 |
| JP | 2000-346169 A | 12/2000 |

OTHER PUBLICATIONS

Russian Decision on Grant and translation dated Oct. 30, 2013, (11 pgs.).

Supplementary European Search Report dated Nov. 11, 2013, (5 pgs.).

* cited by examiner

CONTROL DEVICE OF CONTINUOUSLY VARIABLE TRANSMISSION FOR VEHICLE

TECHNICAL FIELD

The present invention relates to a control device of continuously variable transmission for vehicle.

BACKGROUND ART

JP2000-346169A discloses a control device of continuously variable transmission for vehicle including a sub-transmission mechanism which is switched to a plurality of gear positions in addition to a continuously variable transmission mechanism and configured to change the gear position of the sub-transmission mechanism from a second gear position to a first gear position before a vehicle is stopped to ensure drive power at restart after a stop.

SUMMARY OF INVENTION

However, in the conventional control device of continuously variable transmission for vehicle described above, the gear position may be shifted down from the second gear position to the first gear position when a driver is not exercising an accelerator pedal operation such as when the driver moderately slows down and stops the vehicle with his foot taken off the accelerator pedal. The driver tends to feel a shift shock when he is not exercising the accelerator pedal operation. Thus, in the conventional control device for vehicle continuously variable transmission, a sense of incongruity may be given to a driver even if a shift shock at the time of downshifting is small, which has caused a problem of deteriorating driving performance.

The present invention was developed in view of such a problem and aims to improve driving performance.

To achieve the above object, the present invention is directed to a control device of continuously variable transmission for vehicle comprising a continuously variable transmission mechanism capable of continuously changing a speed ratio; and a sub-transmission mechanism provided in series with the continuously variable transmission mechanism, including a first gear position and a second gear position having a smaller speed ratio than the first gear position as forward gear positions and adapted to switch between the first gear position and the second gear position by selectively engaging or releasing a plurality of frictional engagement elements, wherein a vehicle is stopped with the gear position of the sub-transmission mechanism kept in the second gear position when being stopped in a state where the gear position of the sub-transmission mechanism is in the second gear position.

Embodiments and advantages of this invention will be described in detail below with reference to the attached figures.

EMBODIMENTS OF INVENTION

Hereinafter, embodiments of the present invention are described with reference to the drawings and the like. In the following description, a "speed ratio" of a certain transmission mechanism is a value obtained by dividing an input rotation speed of this transmission mechanism by an output rotation speed thereof. Further, a "lowest speed ratio" means a maximum speed ratio of this transmission mechanism and a "highest speed ratio" means a minimum speed ratio thereof.

First Embodiment

Figure 1:
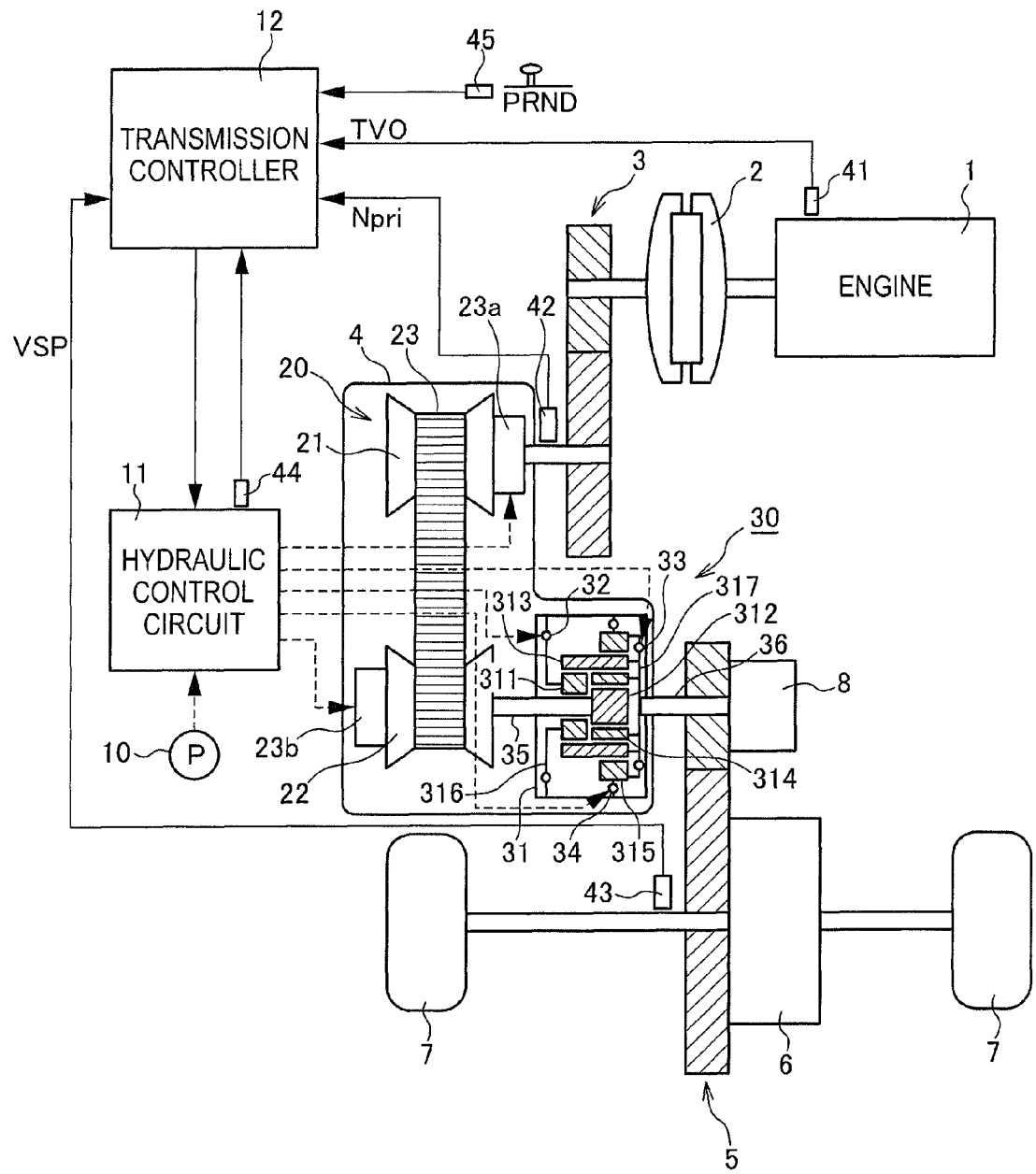
FIG. 1 is a schematic configuration diagram of a vehicle equipped with a continuously variable transmission.

FIG. 1 is a schematic configuration diagram of a vehicle equipped with a continuously variable transmission according to a first embodiment of the present embodiment. This vehicle includes an engine 1 as a drive source. Output rotation of the engine 1 is transmitted to drive wheels 7 via a torque converter 2 with a lock-up clutch, a first gear train 3, a continuously variable transmission (hereinafter, merely referred to as a "transmission") 4, a second gear train 5 and a final speed reducer 6. The second gear train 5 includes a parking mechanism 8 for mechanically locking an output shaft of the transmission 4 in a parked state so as not to be able to rotate.

The vehicle is provided with an oil pump 10 which is driven using a part of power of the engine 1, a hydraulic control circuit 11 for adjusting a hydraulic pressure from the oil pump 10 and supplying the adjusted hydraulic pressure to each component of the transmission 4 and a transmission controller 12 for controlling the hydraulic control circuit 11. The hydraulic control circuit 11 and the transmission controller 12 constitute a transmission control unit.

Each configuration is described. The transmission 4 includes a V-belt continuously variable transmission mechanism (hereinafter, referred to as a "variator") 20 and a sub-transmission mechanism 30 provided in a stage subsequent to and in series with the variator 20. "To be provided in a subsequent stage" means that the sub-transmission mechanism 30 is provided closer to the drive wheels 7 than the variator 20 in a power transmission path from the engine 1 to the drive wheels 7. Further, "to be provided in series" means that the variator 20 and the sub-transmission mechanism 30 are provided in series in this power transmission path. The sub-transmission mechanism 30 may be directly connected to an output shaft of the variator 20 as in this embodiment or may be connected via another transmission mechanism or power transmission mechanism (e.g. gear train).

The variator 20 includes a primary pulley 21, a secondary pulley 22 and a V-belt 23 mounted between the pulleys 21 and 22.

Each of the pulleys 21, 22 includes a fixed conical plate, a movable conical plate arranged such that a sheave surface faces toward the fixed conical plate and a V-groove is formed between the fixed conical plate and the movable conical plate, and a hydraulic cylinder 23a, 23b provided on the back surface of this movable conical plate for displacing the movable conical plate in an axial direction. When hydraulic pressures supplied to the hydraulic cylinders 23a, 23b are adjusted, the widths of the V-grooves change to change contact radii of the V-belt 23 and the respective pulleys 21, 22, whereby a variator speed ratio vRatio continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, rev brake 34) which are connected to a plurality of rotation elements constituting the Ravigneaux-type planetary gear mechanism 31 to change coupled states of these rotation elements. If hydraulic pressures supplied to the respective frictional engagement elements 32 to 34 are adjusted to change engaged and released states of the respective frictional engagement elements 32 to 34, a gear position of the sub-transmission mechanism 30 is changed. In this embodiment, the sub-transmission mechanism 30 is set to a first gear position if the low brake 32 is engaged and the high clutch 33 and the rev brake 34 are released. The transmission mechanism 30 is set to a second gear position having a speed ratio smaller than the first gear position if the high clutch 33 is engaged and the low brake 32 and the rev brake 34 are released. The sub-transmission mechanism 30 is set to a reverse gear position if the rev brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

The Ravigneaux-type planetary gear mechanism 31 includes a front sun gear 311, a rear sun gear 312, long pinion gears 313, short pinion gears 314, a ring gear 315, a front carrier 316 and a rear carrier 317. The Ravigneaux-type planetary gear mechanism 31 is a combination of a double pinion planetary gear mechanism including the rear sun gear 312, the long pinion gears 313, the short pinion gears 314, the ring gear 315 and the rear carrier 317 and a single pinion planetary gear mechanism including the front sun gear 311, the long pinion gears 313, the ring gear 315 and the front carrier 316. The long pinion gears 313 and the ring gear 315 are shared.

The rear sun gear 312 is an external gear which is coupled to an input shaft 35 of the sub-transmission mechanism 30 and rotates together with the input shaft 35.

The ring gear 315 is an internal gear arranged around the rear sun gear 312. The rev brake 34 is provided on the ring gear 315. By engaging the rev brake 32, the rotation of the ring gear 15 is prevented.

A plurality of long pinion gears 313 which are external gears and a plurality of short pinion gears 314 which are external gears are arranged respectively between the rear sun gear 312 and the ring gear 315.

The long pinion gears 313 are engaged with the ring gear 315, the short pinion gears 314 and the front sun gear 311. The long pinion gears 313 can individually rotate (axial rotation) and rotate around the front sun gear 311 (revolution).

The short pinion gears 314 are engaged with the long pinion gears 313 and the rear sun gear 312. The short pinion gears 314 can individually rotate (axial rotation) and rotate around the rear sun gear 312 (revolution).

The ring gear 315, the long pinion gears 313 and the short pinion gears 314 are gathered by the rear carrier 317 coupled to an output shaft 36 of the sub-transmission mechanism 30.

The high clutch 33 is provided on the rear carrier 317. By engaging the high clutch 33, the ring gear 315, the long pinion gears 313 and the short pinion gears 314 rotate together.

The front sun gear 311 is an external gear engaged with the long pinion gears 313. The front sun gear 311 is rotatably supported by the front carrier 316.

The low brake 32 is provided on the front carrier 316. By engaging the low brake 32, the rotation of the front sun gear 311 is prevented.

Figure 2:
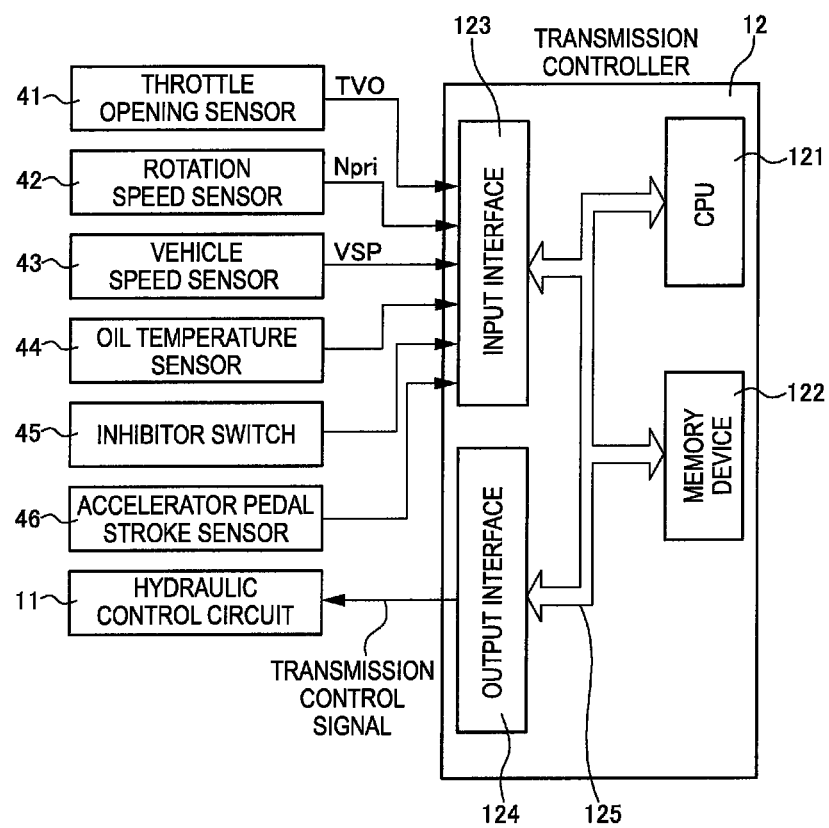
FIG. 2 is a diagram showing the internal configuration of a transmission controller.

The transmission controller 12 includes a CPU 121, a memory device 122 composed of a RAM/ROM, an input interface 123, an output interface 124 and a bus 125 which connects these components to each other as shown in FIG. 2. To the input interface 123 are input output signals of a throttle opening sensor 41, a rotation speed sensor 42, a vehicle speed sensor 43, an oil temperature sensor 44, an inhibitor switch 45 and an accelerator pedal stroke sensor 46. The throttle opening sensor 41 detects an opening TVO of a throttle valve of the engine 1 (hereinafter, referred to as a "throttle opening"). The rotation speed sensor 42 detects an input rotation speed (=rotation speed of the primary pulley 21: hereinafter, referred to as a "primary rotation speed") Npri of the transmission 4. The vehicle speed sensor 43 detects a driving speed VSP of the vehicle (hereinafter, referred to as a "vehicle speed"). The oil temperature sensor 44 detects the oil temperature of the transmission 4. The inhibitor switch 45 detects the position of a select bar. The accelerator pedal stroke sensor 46 detects a depressed amount APO of an accelerator pedal. A transmission control program of the transmission 4 and a shift map (FIG. 4) used in this transmission control program are stored in the memory device 122.

The CPU 121 reads the transmission control program stored in the memory device 122 and implements it to generate a transmission control signal by performing various arithmetic processings on various signals input via the input interface 123. Then, the generated transmission control signal is output to the hydraulic control circuit 11 via the output interface 124. Various values used in the arithmetic processings by the CPU 121 and calculation results thereof are appropriately stored in the memory device 122.

The hydraulic control circuit 11 is composed of a plurality of flow paths and a plurality of hydraulic control valves. The hydraulic control circuit 11 switches a hydraulic pressure supply path, prepares a necessary hydraulic pressure from a hydraulic pressure produced in the oil pump 10 and supplies this to each component of the transmission 4 by controlling the plurality of hydraulic control valves based on the transmission control signal from the transmission controller 12. In this way, the variator speed ratio vRatio and the gear position of the sub-transmission mechanism 30 are changed, whereby the transmission 4 is shifted.

Figure 3:
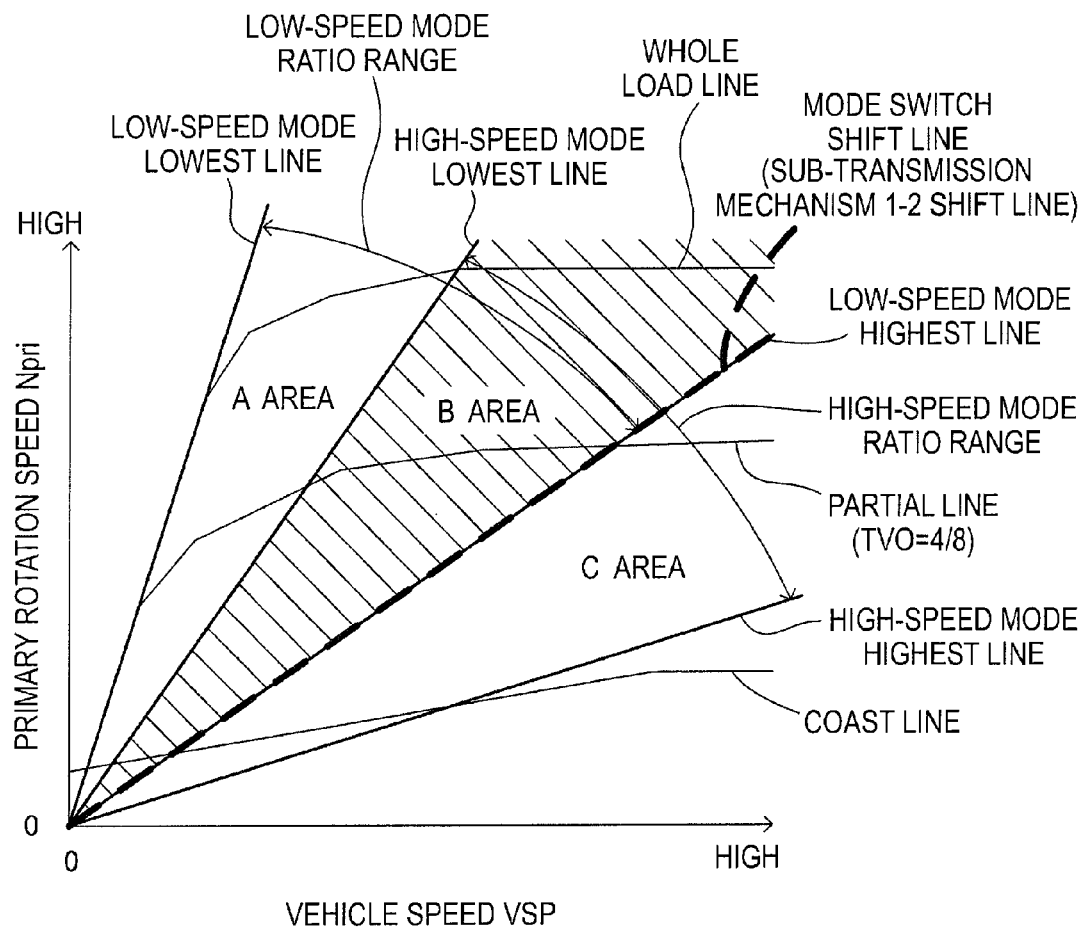
FIG. 3 is a graph showing an example of a shift map of the transmission.

FIG. 3 shows an example of the shift map stored in the memory device 122 of the transmission controller 12.

On this shift map, an operating point of the transmission 4 is determined by the vehicle speed VSP and the primary rotation speed Npri. The inclination of a line connecting the operating point of the transmission 4 and a zero point on the lower left corner of the shift map indicates the speed ratio (hereinafter, referred to as a "through speed ratio") Ratio of the transmission 4. The through speed ratio Ratio is an overall speed ratio obtained by multiplying the speed ratio (hereinafter, referred to as a "variator speed ratio") vRatio of the variator 20 by a speed ratio of the sub-transmission mechanism 30.

In this shift map, a shift line is set for each throttle opening TVO similarly to a shift map of a conventional V-belt continuously variable transmission, and the transmission 4 is shifted in accordance with the shift line selected based on the throttle opening TVO. For simplicity, only a whole load line (shift line when the throttle opening TVO=8/8), a partial load line (shift line when the throttle opening TVO=4/8) and a coast line (shift line when the throttle opening TVO=0) are shown in FIG. 3.

When being in the low-speed mode, the transmission 4 can be shifted between a low-speed mode lowest line obtained by maximizing the variator speed ratio vRatio and a low-speed mode highest line obtained by minimizing the variator speed ratio vRatio. At this time, the operating point of the transmission 4 moves in areas A and B.

On the other hand, when being in the high-speed mode, the transmission 4 can be shifted between a high-speed mode lowest line obtained by maximizing the variator speed ratio vRatio and a high-speed mode highest line obtained by minimizing the variator speed ratio vRatio. At this time, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is smaller than the speed ratio corresponding to the high-speed mode lowest line (high-speed mode lowest speed ratio). By this, a low-speed mode ratio range which is a range of the through speed ratio Ratio of the transmission 4 that can be set in the low-speed mode and a high-speed mode ratio range which is a range of the through speed ratio Ratio of the transmission 4 that can be set in the high-speed mode partly overlap. That is, the transmission 4 can be selectively set in either one of the low-speed mode and the high-speed mode when the operating point of the transmission 4 is in the area B defined between the high-speed mode lowest line and the low-speed mode highest line.

On this shift map, a mode switch shift line (1-2 shift line of the sub-transmission mechanism 30) at which the sub-transmission mechanism 30 is shifted is so set as to overlap the low-speed mode highest line. A through speed ratio (hereinafter, referred to as a "mode switch speed ratio") mRatio corresponding to the mode switch shift line is set at a value equal to the low-speed mode highest speed ratio. A mode switch shift is performed when the operating point of the transmission 4 crosses the mode switch shift line, i.e. when the through speed ratio Ratio of the transmission 4 changes over the mode switch speed ratio mRatio.

At the time of the mode switch shift, the transmission controller 12 shifts the sub-transmission mechanism 30 and performs a synchronization shift to change the variator speed ratio vRatio in a direction opposite to a changing direction of the speed ratio of the sub-transmission mechanism 30. The variator speed ratio vRatio is changed in the direction opposite to the changing direction of the speed ratio of the sub-transmission mechanism 30 to prevent a sense of incongruity from being given to a driver due to a change in input rotation caused by a discrete change of the through speed ratio Ratio during the mode switch shift.

Specifically, when the through speed ratio Ratio of the transmission 4 changes from a value larger than the mode switch speed ratio mRatio to a value smaller than that, the transmission controller 12 changes the gear position of the sub-transmission mechanism 30 from the first gear position to the second gear position (1-2 shift) and changes the variator speed ratio vRatio to a large speed ratio side.

Conversely, when the through speed ratio Ratio of the transmission 4 changes from a value smaller than the mode switch speed ratio mRatio to a value larger than that, the transmission controller 12 changes the gear position of the sub-transmission mechanism 30 from the second gear position to the first gear position (2-1 shift) and changes the variator speed ratio vRatio to a small speed ratio side.

However, depending on the deceleration of the vehicle, there are times when the variator speed ratio vRatio changed to the small speed ratio side has to be changed to the large speed ratio side during the 2-1 shift to prevent a discrete change of the through speed ratio Ratio.

In the case of changing the gear position of the sub-transmission mechanism 30, a shift shock is smaller when the variator speed ratio vRatio is at a high side (when it is small). This results from a physical property that the smaller a torque input to the sub-transmission mechanism 30, the smaller a shift shock of the sub-transmission mechanism 30.

Accordingly, if the variator speed ratio vRatio is changed to the large speed ratio side during the 2-1 shift, a shift shock is promoted to give a sense of incongruity to the driver. Particularly, if the shift shock is promoted when the driver is not exercising an accelerator pedal operation such as when the driver moderately slows down the vehicle with his foot completely taken off the accelerator pedal, a larger sense of incongruity is given to the driver.

Accordingly, in this embodiment, when the vehicle is stopped in a state where the gear position of the sub-transmission mechanism 30 is in the second gear position, the vehicle is stopped with the gear position kept in the second gear position without being changed. Then, the gear position of the sub-transmission mechanism 30 is changed from the second gear position to the first gear position while the vehicle is stopped.

In this way, no shift is made to the first gear position when the vehicle is stopped in the state where the gear position of the sub-transmission mechanism 30 is in the second gear position, wherefore a shift shock caused by the shift to the first gear position can be prevented. Further, by changing the gear position of the sub-transmission mechanism 30 from the second gear position to the first gear position after the vehicle is stopped, drive power at restart can be ensured.

Here, it is desirable to control the hydraulic pressures of each frictional engagement element such that a total torque capacity of a torque capacity of the engagement-side frictional engagement element (high clutch 33 at the time of the 1-2 shift, low brake 32 at the time of the 2-1 shift) and a torque capacity of the release-side frictional engagement element (low brake 32 at the time of the 1-2 shift, high clutch 33 at the time of the 2-1 shift) is larger than an input torque of the sub-transmission mechanism 30. If the total torque capacity is smaller than the input torque of the sub-transmission mechanism 30, each frictional engagement element slips, which may cause a sudden increase in the engine rotation speed or the occurrence of a shock when the frictional engagement element is engaged after the slip. Note that the torque capacity is an upper limit torque transmittable by each frictional engagement element.

When the 2-1 shift is performed while the vehicle is stopped, a shock does not occur even if the torque capacity of the low brake 32 that is the engagement-side frictional engagement element is increased by increasing the hydraulic pressure of the low brake 32 since the sub-transmission mechanism 30 is not rotating.

Accordingly, when the 2-1 shift is performed while the vehicle is stopped, the torque capacity of the high clutch 33 may be reduced after the torque capacity of the low brake 32 is increased up to the input torque of the sub-transmission mechanism 30 in transferring the reception of the input torque of the sub-transmission mechanism 30 from the high clutch 33 that is the release-side frictional engagement element to the low brake 32.

Here, it is thought to change the gear position of the sub-transmission mechanism 30 during running. The torque capacity of the frictional engagement element (low brake 32 when the transmission 4 is in the low-speed mode, high clutch 33 when the transmission 4 is in the high-speed mode) engaged during running is desirably a minimum torque capacity at which this frictional engagement element does not slip. That is, it is desirable to control the torque capacity of the frictional engagement element engaged during running to be a capacity which is the sum of the input torque of the sub-transmission mechanism 30 and a predetermined margin (torque equivalent to the input torque: hereinafter, referred to as a "normal target torque capacity").

More specifically, a hydraulic pressure supplied to the frictional engagement element engaged during running is desirably controlled to be a hydraulic pressure at which the torque capacity of this frictional engagement element becomes the normal target torque capacity (hereinafter, referred to as a "normal target hydraulic pressure").

This is because friction during running increases and fuel economy is deteriorated if the hydraulic pressure of the frictional engagement element engaged during running is unnecessarily higher than the normal target hydraulic pressure.

This is further because driving performance at the time of performing upshifting associated with a mode switch shift during running is deteriorated if the hydraulic pressure of the frictional engagement element engaged during running is unnecessarily higher than the normal target hydraulic pressure. This point is described with reference to FIGS. 8 and 9.

Figure 8:
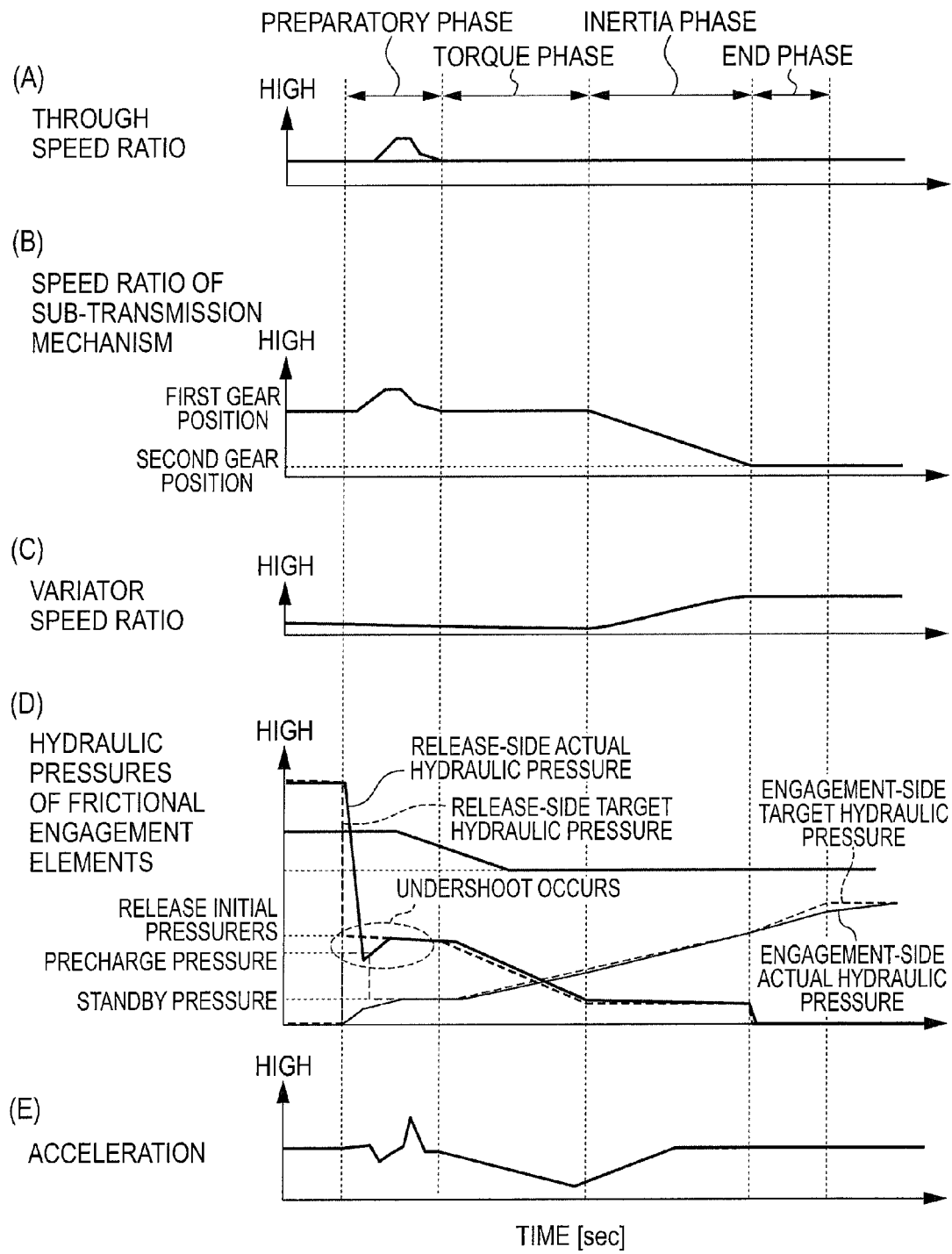
Figure 9:
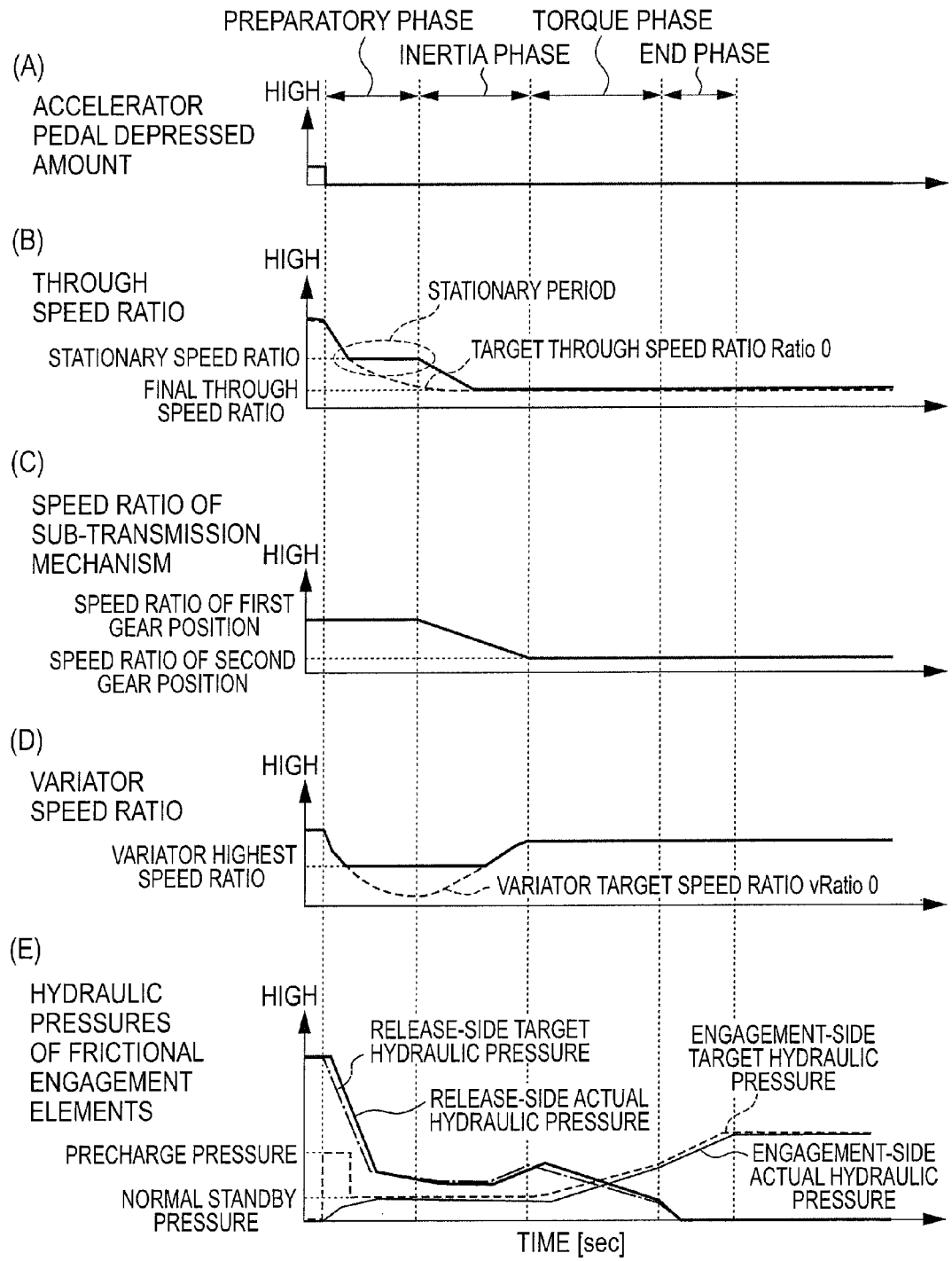

FIG. 8 are time charts when the undershoot of the hydraulic pressure occurs during upshifting associated with a mode switch shift performed in a power-ON state (hereinafter, referred to as "power-ON upshifting") during running. FIG. 9 are time charts when a stationary period during which the engine rotation speed does not temporarily change by being kept at the same rotation speed occurs during upshifting associated with a mode switch shift performed in a power-OFF state (hereinafter, referred to as "power-OFF upshifting") during running.

The power-ON state is a state where the accelerator pedal is depressed, i.e. a state where the input torque of the transmission 4 is a positive torque (torque at which an input side of the transmission 4 is a drive side). The power-OFF state is a state where the accelerator pedal is not depressed, i.e. a state where the input torque of the transmission 4 is a negative torque (torque at which an output side of the transmission 4 is a drive side).

As shown in FIG. 8, in the case of power-ON upshifting, the sub-transmission mechanism 30 finishes the 1-2 shift through a preparatory phase, a torque phase, an inertia phase and an end phase.

The preparatory phase is a phase for preparation to change the gear position of the sub-transmission mechanism 30. Specifically, the hydraulic pressure of the release-side frictional engagement element of the sub-transmission mechanism 30 is reduced to a release initial pressure and a target hydraulic pressure of the engagement-side frictional engagement element is reduced to a standby pressure (engagement initial pressure) after being kept at a precharge pressure for a predetermined time. The release initial pressure is a hydraulic pressure value at which the torque capacity of the release-side frictional engagement element is set such that the release-side frictional engagement element slips, i.e. a hydraulic pressure value for making the torque capacity of the release-side frictional engagement element equivalent to the input torque of the sub-transmission mechanism 30. The standby pressure is a hydraulic pressure value at which the torque capacity of the engagement-side frictional engagement element is set such that the engagement-side frictional engagement element is capable of transmitting a torque.

The torque phase is a phase for transferring the reception of the input torque of the sub-transmission mechanism 30 from the release-side frictional engagement element to the engagement-side frictional engagement element. Specifically, the hydraulic pressure of the release-side frictional engagement element is reduced toward zero, whereas the hydraulic pressure of the engagement-side frictional engagement element is increased from the standby pressure.

The inertia phase is a phase until the speed ratio becomes constant after a speed ratio change of the sub-transmission mechanism 30 is started. Specifically, the hydraulic pressure of the release-side frictional engagement element is reduced toward zero, whereas the hydraulic pressure of the engagement-side frictional engagement element is increased from the standby pressure.

The end phase is a phase for completely engaging the engagement-side frictional engagement element.

Here, if the hydraulic pressure of the release-side frictional engagement element is too high relative to the release initial pressure, an undershoot may occur when the hydraulic pressure of the release-side frictional engagement element is converged to the release initial pressure in the preparatory phase. If such an undershoot occurs, the input torque of the sub-transmission mechanism 30 temporarily becomes larger than the torque capacity of the release-side frictional engagement element. Thus, the release-side frictional engagement element may slip to suddenly increase the engine rotation speed or a shock may occur at the time of engagement after the slip, whereby driving performance may be deteriorated.

To suppress the occurrence of such an undershoot, it is thought to moderately reduce the hydraulic pressure of the release-side frictional engagement element to the release initial pressure.

However, as shown in FIG. 9, unlike the case of power-ON upshifting, the inertia phase follows the preparatory phase in the case of power-OFF upshifting. Thus, if the hydraulic pressure of the release-side frictional engagement element is moderately reduced to the release initial pressure, it takes a longer time until the inertia phase is started.

Here, in this embodiment, the through speed ratio Ratio is changed in a predetermined transient response (e.g. primary response) toward a final through speed ratio DRatio. That is, a target through speed ratio Ratio0 used to change the through speed ratio Ratio toward the final through speed ratio DRatio in the predetermined transient response is set, and the through speed ratio Ratio is controlled to be the target through speed ratio Ratio0. Then, a target speed ratio (hereinafter, referred to as a "variator target speed ratio") vRatioO of the variator 20 is calculated by dividing the target through speed ratio Ratio0 by the speed ratio of the sub-transmission mechanism 30, and the variator 20 is so controlled that the variator speed ratio vRatio becomes a variator target speed ratio vRatio0.

To this end, the through speed ratio Ratio is controlled to be the target through speed ratio Ratio0 by changing only the variator speed ratio vRatio until the start of the inertia phase where the speed ratio of the sub-transmission mechanism 30 changes.

Accordingly, if it takes a long time until the inertia phase is started, the variator speed ratio vRatio may reach a highest speed ratio of the variator 20 (hereinafter, referred to as a "variator highest speed ratio") before the inertia phase is started. Then, a state is set where the through speed ratio Ratio does not change until the inertia phase is started (see a part encircled by broken line in FIG. 9) and a stationary period during which the engine rotation speed does change despite occurrence of upshifting. As a result, a smooth rotation change at the time of gear shift is impaired to deteriorate driving performance. Further, if the output rotation speed of the transmission 4 is high (vehicle speed is high), the stationary period occurs in a state where the engine rotation speed is high, wherefore fuel economy is also deteriorated.

Here, in the case of stopping the vehicle in the state where the gear position of the sub-transmission mechanism 30 is in the second gear position as in this embodiment, it is desirable to change the gear position of the sub-transmission mechanism 30 to the first gear position as early as possible while the vehicle is stopped to ensure drive power at restart.

However, if the target hydraulic pressure of the low brake 32 that is the engagement-side frictional engagement element is set at the normal target hydraulic pressure when the 2-1 shift is performed while the vehicle is stopped, the sub-transmission mechanism 30 cannot be shifted until the vehicle is restarted and it may not be possible to ensure drive power.

As described above, when the 2-1 shift is performed while the vehicle is stopped, the torque capacity of the high clutch 33 is reduced after the torque capacity of the low brake 32 is increased to the input torque of the sub-transmission mechanism. Thus, the longer the time until the torque capacity of the low brake 32 reaches the input torque of the sub-transmission mechanism 30, the longer the shifting time of the sub-transmission mechanism 30.

When the 2-1 shift is performed while the vehicle is stopped, the hydraulic pressure of the low brake 32 that is an engagement-side frictional engagement element is changed to the target hydraulic pressure in a predetermined transient response. Thus, the time until the torque capacity of the low brake 32 reaches the input torque of the sub-transmission mechanism 30 becomes shorter since the hydraulic pressure increases faster as the target hydraulic pressure of the low brake 32 is increased from the hydraulic pressure at which the torque capacity of the low brake 32 is equal to the input torque of the sub-transmission mechanism 30.

Accordingly, if the target hydraulic pressure of the low brake 32 is set at the normal target hydraulic pressure equivalent to the input torque of the sub-transmission mechanism 30, it takes a long time until the torque capacity of the low brake 32 reaches the input torque of the sub-transmission mechanism 30. Thus, the sub-transmission mechanism 30 cannot be shifted until the vehicle is restarted and it may not be possible to ensure drive power.

From the above, as in this embodiment, it is desirable to set the target hydraulic pressure of the low brake 32 at a highest possible value in performing the 2-1 shift while the vehicle is stopped in the case of stopping the vehicle in the state where the gear position of the sub-transmission mechanism 30 is in the second gear position.

Accordingly, in this embodiment, the target torque capacity of the low brake 32 is set at a startup target torque capacity higher than the normal target torque capacity when the 2-1 shift is performed while the vehicle is stopped. More specifically, the target hydraulic pressure of the low brake 32 is set at a startup target hydraulic pressure higher than the normal target hydraulic pressure. The startup target hydraulic pressure is a hydraulic pressure necessary to set the torque capacity of the low brake 32 at the startup target torque capacity.

A during-stop transmission control according to this embodiment is described below. The transmission controller 12 executes this routine in a predetermined calculation cycle (e.g. 10 ms).

Figure 4:
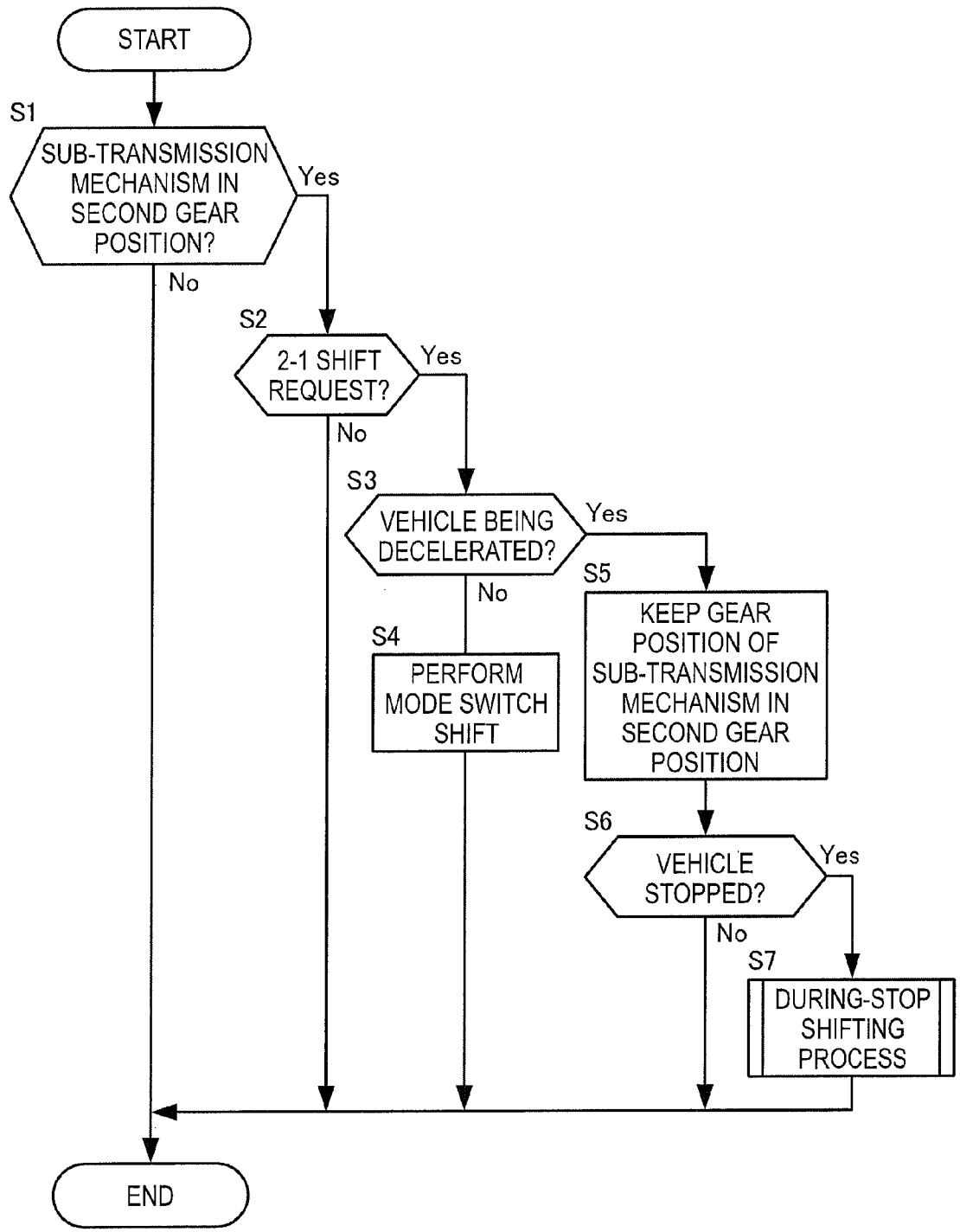
FIG. 4 is a flow chart showing a during-stop transmission control according to a first embodiment.

FIG. 4 is a flow chart showing the during-stop transmission control according to this embodiment.

In Step S1, the transmission controller 12 determines whether or not the gear position of the sub-transmission mechanism 30 is in the second gear position. The transmission controller 12 advances the process to Step S2 if the gear position of the sub-transmission mechanism 30 is in the second gear position, whereas the process this time is finished if the gear position of the sub-transmission mechanism 30 is in the first gear position.

In Step S2, the transmission controller 12 determines whether or not there is a request to change the gear position of the sub-transmission mechanism 30 from the second gear position to the first gear position. Specifically, whether or not the through speed ratio Ratio of the transmission 4 is larger than the mode switch speed ratio Ratio is determined. The transmission controller 12 advances the process to Step S3 if judging that the through speed ratio Ratio of the transmission 4 is larger than the mode switch speed ratio mRatio and there is a request for the 2-1 shift while finishing the process this time unless otherwise.

In Step S3, the transmission controller 12 determines whether or not the vehicle is being decelerated. The transmission controller 12 advances the process to Step S4 unless the vehicle is being decelerated while advancing the process to Step S5 if the vehicle is being decelerated.

In Step S4, the transmission controller 12 performs the mode switch shift described above. Specifically, the gear position of the sub-transmission mechanism 30 is changed from the second gear position to the first gear position (2-1 shift) and the variator speed ratio vRatio is changed to the small speed ratio side. That is, the mode switch speed ratio mRatio is caused to function as a down-shift line used to change the gear position of the sub-transmission mechanism 30 from the second gear position to the first gear position.

In Step S5, the transmission controller 12 keeps the gear position of the sub-transmission mechanism 30 in the second gear position without performing the mode switch shift described above. That is, the mode switch speed ratio mRatio is prevented from functioning as the down-shift line used to change the gear position of the sub-transmission mechanism 30 from the second gear position to the first gear position.

In Step S6, the transmission controller 12 determines whether or not the vehicle is stopped. The transmission controller 12 advances the process to Step S7 if the vehicle is stopped while finishing the process this time unless the vehicle is stopped.

In Step S7, the transmission controller 12 performs a during-stop shifting process. Specific contents are described later with reference to FIG. 5

Figure 5:
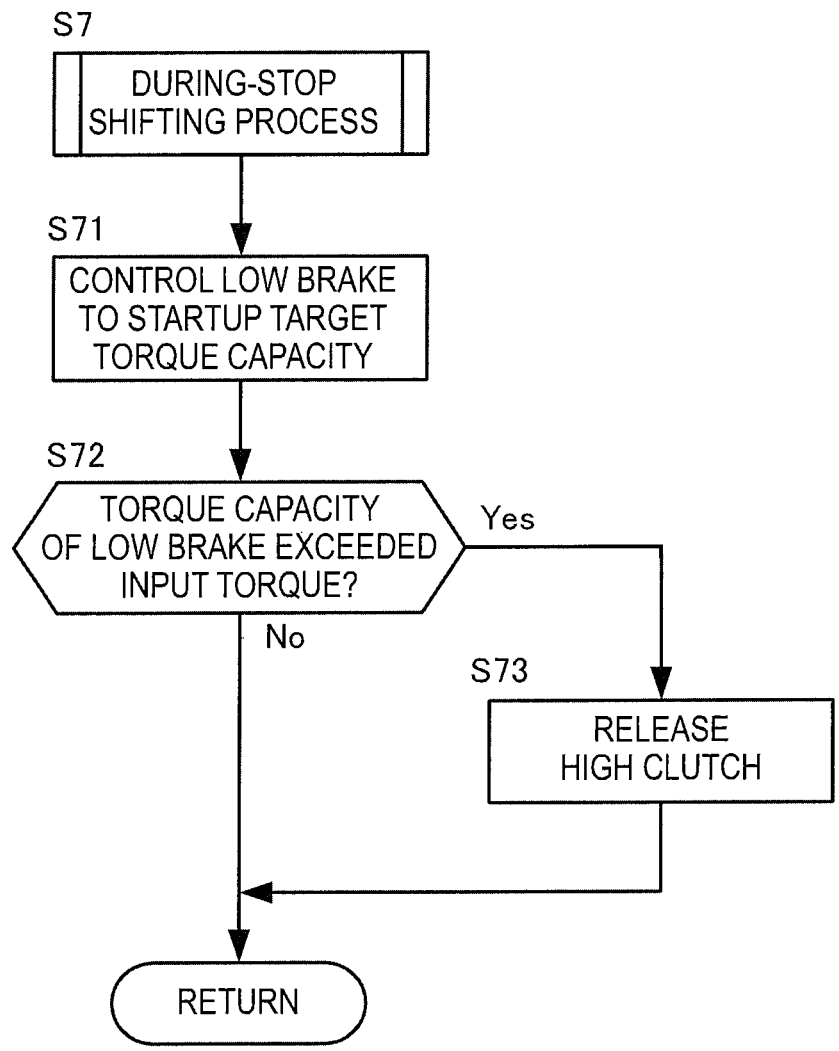
FIG. 5 is a flow chart showing a during-stop shifting process, FIG. 6 are time charts showing the during-stop transmission control according to the first embodiment, FIG. 7 are time charts showing a during-stop transmission control according to a second embodiment, FIG. 8 are time charts when the undershoot of a hydraulic pressure occurs during upshifting associated with a mode switch shift performed in a power-ON state during running, FIG. 9 are time charts when a stationary period during which an engine rotation speed does not temporarily change by being kept at the same rotation speed occurs during upshifting associated with a mode switch shift performed in a power-OFF state during running.

FIG. 5 is a flow chart showing the during-stop shifting process.

In Step S71, the transmission controller 12 controls the torque capacity of the low brake 32 toward the startup target torque capacity. Specifically, the target hydraulic pressure of the low brake 32 is set at the startup target hydraulic pressure and the hydraulic pressure of the low brake 32 is changed toward the startup target hydraulic pressure in a predetermined transient response.

In Step S72, the transmission controller 12 determines whether or not the torque capacity of the low brake 32 has exceeded the input torque of the sub-transmission mechanism 30. Specifically, it is determined whether or not a time after the hydraulic pressure of the low brake 32 is changed toward the startup target hydraulic pressure has exceeded a predetermined time. The transmission controller 12 advances the process to Step S73 if the time after the hydraulic pressure of the low brake 32 is changed toward the startup target hydraulic pressure has exceeded the predetermined time while finishing the process this time unless otherwise.

In Step S73, the transmission controller 12 sets the target hydraulic pressure of the high clutch 33 at zero and changes the hydraulic pressure of the high clutch 33 toward zero in a predetermined transient response.

Figure 6:
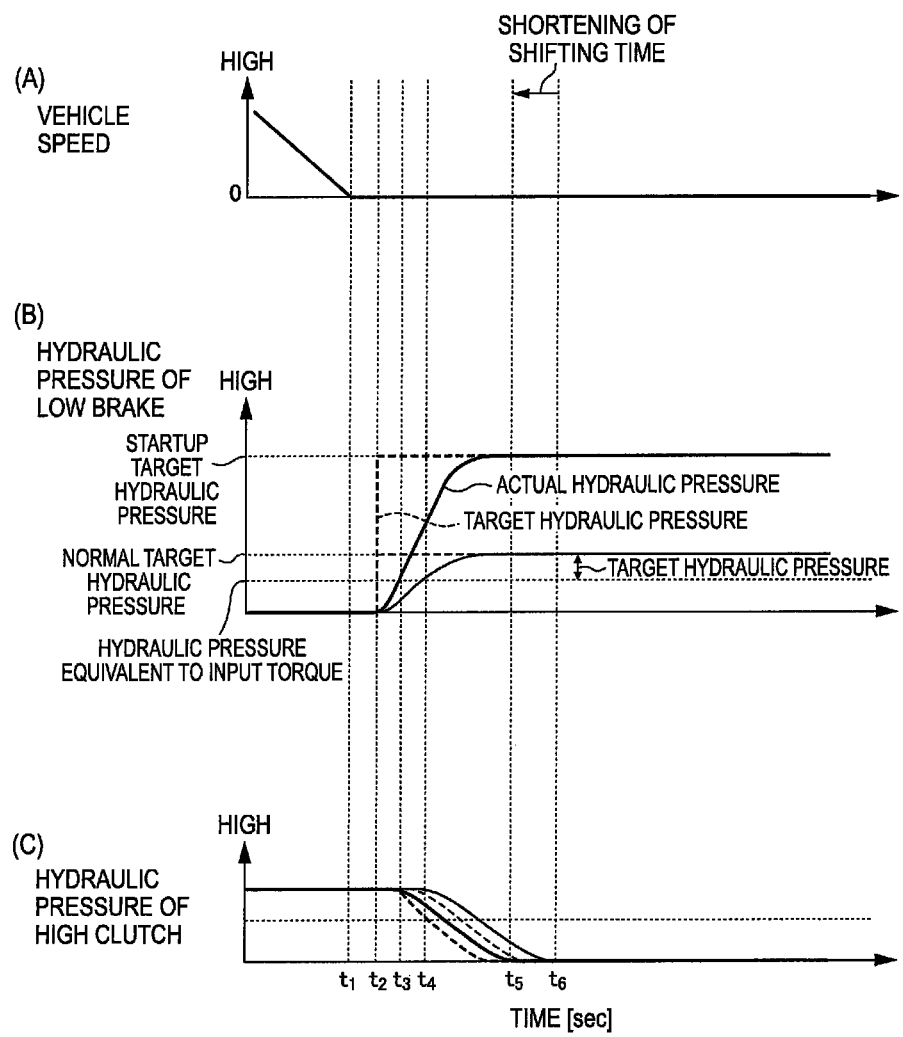

FIG. 6 are time charts showing the during-stop transmission control according to this embodiment. To facilitate the understanding of the invention, a case where the target hydraulic pressure of the low brake 32 is set at the normal target hydraulic pressure is shown by thin line as a comparative example.

When the vehicle is stopped in the state where the gear position of the sub-transmission mechanism 30 is in the second gear position at time t1, the target hydraulic pressure of the low brake 32 is set at the startup target hydraulic pressure and the hydraulic pressure of the low brake 32 is changed toward the startup target hydraulic pressure in a predetermined transient response at time t2.

When an elapsed time from time t2 becomes longer than a predetermined time and the torque capacity of the low brake 32 becomes larger than the input torque of the sub-transmission mechanism 30 at time t3, the hydraulic pressure of the high clutch 33 is changed toward zero.

At time t5, the 2-1 shift is finished.

Here, in the case of this embodiment, the target hydraulic pressure of the low brake 32 is set at the startup target hydraulic pressure higher than the normal target hydraulic pressure. Thus, although the torque capacity of the low brake 32 becomes larger than the input torque of the sub-transmission mechanism 30 at time t4 in the comparative example, it becomes larger than the input torque of the sub-transmission mechanism 30 at time t3 earlier than that in this embodiment.

That is, as compared with the comparative example, a time required to make the torque capacity of the low brake 32 larger than the input torque of the sub-transmission mechanism 30 is shorter. Thus, the 2-1 shift is finished at time t6 in the comparative example, whereas it is finished at time t5 earlier than that in this embodiment, wherefore the shifting time of the sub-transmission mechanism 30 while the vehicle is stopped can be made shorter than in the comparative example.

According to this embodiment described above, the vehicle is stopped with the gear position of the sub-transmission mechanism 30 kept in the second gear position when stopping the vehicle in the state where the gear position of the sub-transmission mechanism 30 is in the second gear position. Then, the gear position of the sub-transmission mechanism 30 is changed from the second gear position to the first gear position while the vehicle is stopped.

In this way, the gear position of the sub-transmission mechanism 30 is not changed from the second gear position to the first gear position during running before the vehicle is stopped and the gear position of the sub-transmission mechanism is changed from the second gear position to the first gear position while the vehicle is stopped. Thus, a shift shock of the sub-transmission mechanism 30 can be prevented and driving performance can be improved. Further, since the gear position of the sub-transmission mechanism 30 is changed from the second gear position to the first gear position while the vehicle is stopped, drive power at restart can be ensured.

Further, when the gear position of the sub-transmission mechanism 30 is changed from the second gear position to the first gear position while the vehicle is stopped, the target hydraulic pressure of the low brake 32 that is the engagement-side frictional engagement element is set at the startup target hydraulic pressure. Then, the hydraulic pressure of the low brake 32 is changed toward the startup target hydraulic pressure in a predetermined transient response.

Here, the startup target hydraulic pressure is higher than the normal target hydraulic pressure for making the torque capacity of the low brake 32 equivalent to the input torque of the sub-transmission mechanism 30. Thus, the gradient of a hydraulic pressure increase increases and the torque capacity of the low brake 32 can be caused to reach the input torque of the sub-transmission mechanism 30 earlier than when the hydraulic pressure of the low brake 32 is changed toward the normal target hydraulic pressure in a predetermined transient response.

Accordingly, the hydraulic pressure of the high clutch 32 can be reduced earlier than when the target hydraulic pressure of the low brake 32 is set at the normal target hydraulic pressure in changing the gear position of the sub-transmission mechanism 30 from the second gear position to the first gear position while the vehicle is stopped.

In this way, the shift of the sub-transmission mechanism 30 can be reliably finished before the vehicle is restarted. Therefore, the lack of drive power resulting from the shift of the sub-transmission mechanism 30 that is not finished yet when the vehicle is restarted, can be suppressed.

Second Embodiment

Next, a second embodiment of the present invention is described. The second embodiment of the present invention differs from the first embodiment in that a neutral idle (hereinafter, referred as "N-idle") control is performed in a stopped state of a vehicle where a predetermined condition holds. That point of difference is described below. Note that parts fulfilling functions similar to those of the above embodiment are denoted by the same reference signs and repeated description thereof is appropriately omitted.

The N-idle control is a control for setting the low brake 32 of the sub-transmission mechanism 30 in a slip state while the vehicle is stopped and the select lever is set in a drive range. Specifically, after being increased to a predetermined N-idle start hydraulic pressure, the hydraulic pressure of the low brake 32 is gradually reduced to reduce the torque capacity of the low brake 32 to the vicinity of zero while the vehicle is stopped and the select lever is set in the drive range.

Note that, in this embodiment, the N-idle start hydraulic pressure is set based on a hydraulic pressure supplied to the hydraulic cylinders 23a, 23b from the oil pump 10 via the hydraulic control circuit 11 (hereinafter, referred to as a "line pressure") while the vehicle is stopped. Specifically, the upper limit of the N-idle start hydraulic pressure is set to be equal to or lower than a line pressure.

This is for the following reason. Since the upper limit of the value of the hydraulic pressure that can be supplied to the low brake 32 is the line pressure, the line pressure itself needs to be increased if the N-idle start hydraulic pressure is set at a value larger than the normal line pressure while the vehicle is stopped. Thus, an idle rotation speed needs to be increased by that much, wherefore fuel economy is deteriorated.

Since the torque converter 2 can be released from a stalled state and the load of the engine 1 can be reduced by performing the N-idle control, the amount of fuel consumption while the vehicle is stopped can be suppressed.

Here, when the 2-1 shift is performed while the vehicle is stopped, the N-idle control is performed after the 2-1 shift is finished. Thus, if the hydraulic pressure of the low brake 32 is changed toward the N-idle start hydraulic pressure after the end of the 2-1 shift, it takes time until the N-idle control is performed and fuel economy is deteriorated.

Accordingly, in this embodiment, it is made possible to perform the N-idle control immediately after the end of the 2-1 shift by setting the startup hydraulic pressure at the N-idle start hydraulic pressure.

Figure 7:
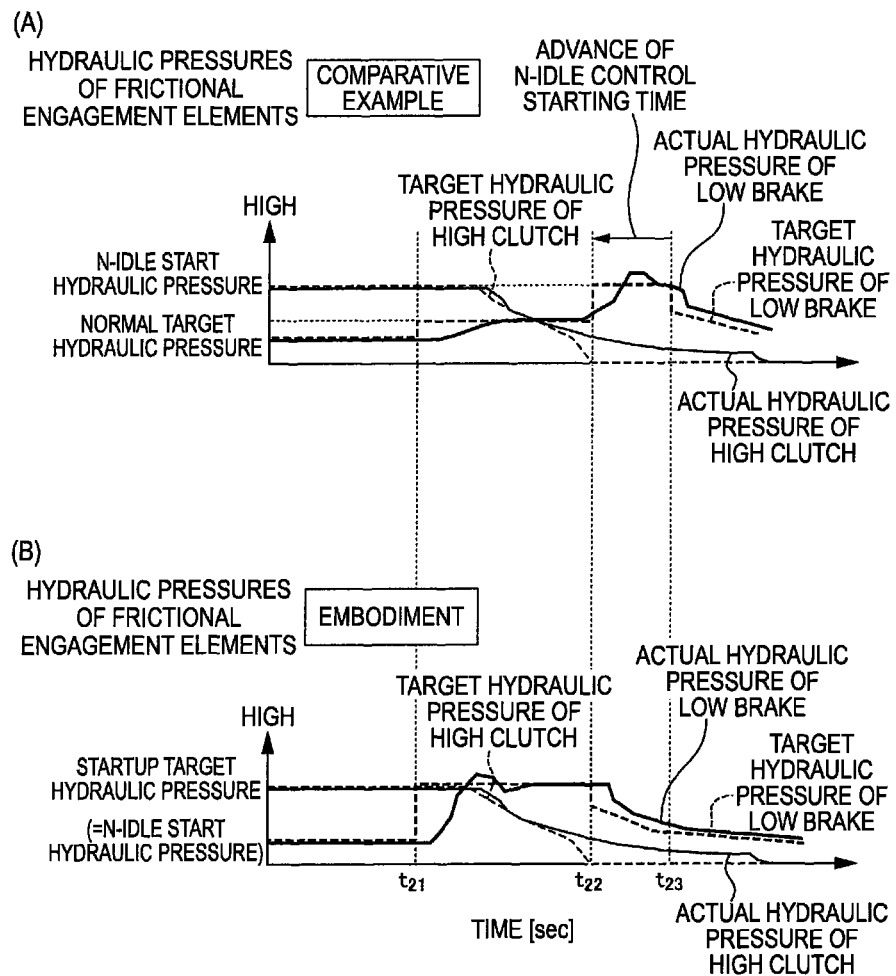

FIG. 7(B) is a time chart showing a during-stop transmission control according to this embodiment. Note that, to facilitate the understanding of the invention, a case where the target hydraulic pressure of the low brake 32 is set at the normal target hydraulic pressure is shown in FIG. 7(A) as a comparative example.

In the case of this embodiment, at time t21, the target hydraulic pressure of the low brake 32 is set at the N-idle start hydraulic pressure and the hydraulic pressure of the low brake 32 is changed toward the N-idle start hydraulic pressure in a predetermined transient response.

Immediately after the 2-1 shift is finished at time t22, the N-idle control is started and the torque capacity of the low brake 32 is reduced to the vicinity of zero by gradually reducing the hydraulic pressure of the low brake 32.

Contrary to this, in the case of the comparative example, the hydraulic pressure of the low brake 32 needs to be increased from the normal target hydraulic pressure to the N-idle start hydraulic pressure after the 2-1 shift is finished at time t22. The N-idle control is started after time t23 at which the hydraulic pressure of the low brake 32 is increased to the N-idle start hydraulic pressure. Thus, it takes more time until the N-idle control is started than in the case of this embodiment, wherefore fuel economy is deteriorated.

Since the startup target hydraulic pressure is set at the N-idle start hydraulic pressure according to this embodiment described above, the N-idle control can be performed immediately after the end of the 2-1 shift.

This can suppress the amount of fuel consumption while the vehicle is stopped and improve fuel economy in addition to effects similar to those of the first embodiment.

Concerning the above description, the contents of Japanese Patent Application No. 2010-37065 filed with the Japan Patent Office on Feb. 23, 2010 are hereby incorporated by reference.

This invention has been described above by way of the specific embodiment, but this invention is not limited to the above embodiment. It is possible for a person skilled in the art to make various modifications and changes in the above embodiment within the technical scope of the present invention.

For example, although the sub-transmission mechanism 30 is a transmission mechanism having the first and second gear positions as forward gear positions, it may be a transmission mechanism having three or more forward gear positions.

Although the sub-transmission mechanism 30 is configured using the Ravigneaux-type planetary gear mechanism, it is not limited to such a configuration. For example, it may be configured by combining a normal planetary gear mechanism and frictional engagement elements or may be configured by a plurality of power transmission paths including a plurality of gear trains having different gear ratios and frictional engagement elements for switching these power transmission paths.

Although the hydraulic cylinders 23a, 23b are provided as actuators for displacing the movable conical plates of the pulleys 21, 22 in the axial directions, the actuators are not limited to hydraulically driven ones and may be electrically driven.

Although the mode switch speed ratio is set at a value equal to the low-speed mode highest speed ratio, "equal" mentioned here also means a case of being substantially equal and such a case is also included in the technical scope of the present invention.

Although the so-called V-belt continuously variable transmission mechanism using the belt and the pulleys is illustrated as the variator 20, the variator 20 is not limited to this. For example, the variator 20 may be a so-called chain continuously variable transmission mechanism using a chain and pulleys or a so-called toroidal continuously variable transmission mechanism using a power roller and input and output disks.

The invention claimed is:

1. A control device of a continuously variable transmission for a vehicle, comprising:
a continuously variable transmission mechanism capable of continuously changing a speed ratio;
a sub-transmission mechanism provided in series with the continuously variable transmission, including a first gear position and a second gear position having a smaller speed ratio than a speed ratio of the first gear position as forward gear positions and adapted to switch between the first gear position and the second gear position by selectively engaging or releasing a plurality of frictional engagement elements;
a transmission control unit configured to switch the gear position of the sub-transmission mechanism to the first gear position after the vehicle is stopped with the gear position of the sub-transmission mechanism kept in the second gear position; and
a during-stop target torque capacity setting unit configured to set a target torque capacity of an engagement-side frictional engagement element, which needs to be engaged for switching the gear position of the sub-transmission mechanism to the first gear position, out of the plurality of frictional engagement elements at a startup torque capacity larger than an input torque input to the sub-transmission mechanism while the vehicle is stopped when the gear position of the sub-transmission mechanism is switched from the second gear position to the first gear position while the vehicle is stopped.

2. The control device of a continuously variable transmission for a vehicle according to claim 1, further comprising a neutral idle control unit configured to reduce a torque capacity of the engagement-side frictional engagement element engaged substantially to zero after increasing it to a predetermined neutral idle start torque capacity while the vehicle is stopped in a state where the gear position of the sub-transmission mechanism is in the first gear position,
wherein the during-stop target torque capacity setting unit sets the startup torque capacity to the neutral idle start torque capacity.

* * * * *